No. 844,822. PATENTED FEB. 19, 1907.
A. H. MARKS.
METHOD OF FORMING SOLID RUBBER TIRES.
APPLICATION FILED MAY 11, 1906.

Witnesses

Inventor
Arthur H. Marks
By Parsons & Burch and
James W. Bevans
his Attorneys

UNITED STATES PATENT OFFICE.

ARTHUR H. MARKS, OF AKRON, OHIO.

METHOD OF FORMING SOLID RUBBER TIRES.

No. 844,822.        Specification of Letters Patent.        Patented Feb. 19, 1907.

Application filed May 11, 1906. Serial No. 316,361.

*To all whom it may concern:*

Be it known that I, ARTHUR H. MARKS, a citizen of the United States, residing at Akron, in the county of Summit and State of Ohio, have invented certain new and useful Improvements in Methods of Forming Solid Rubber Tires, of which the following is a specification.

This invention relates to the method of forming solid rubber tires having a plurality of layers of metal fabric embedded in the base; and the object is to provide an improved method for forming tires of this type characterized by bringing the line of adhesion between the tread and base portions of the tire within the zone of the metal fabric, whereby the joint between the two parts is subjected to less strain, and consequently a stronger tire produced.

With the above object in view the invention consists in the novel features of construction hereinafter fully described, particularly pointed out in the claims, and clearly illustrated by the accompanying drawings, in which—

Figure 1:
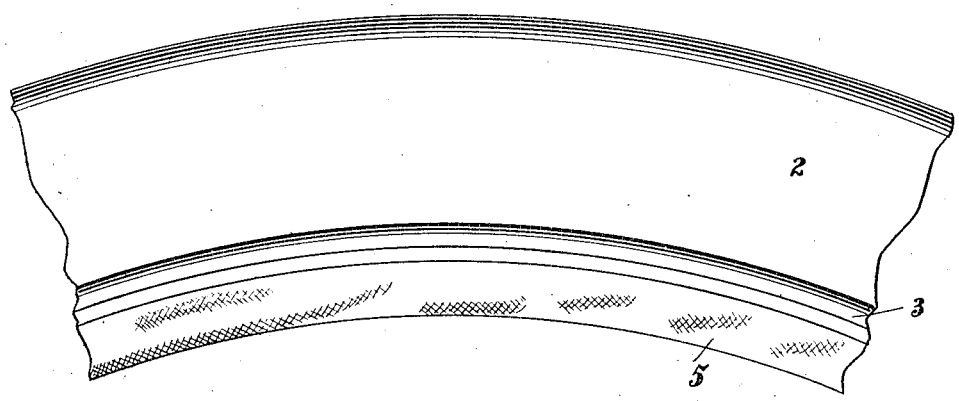
Figure 2:
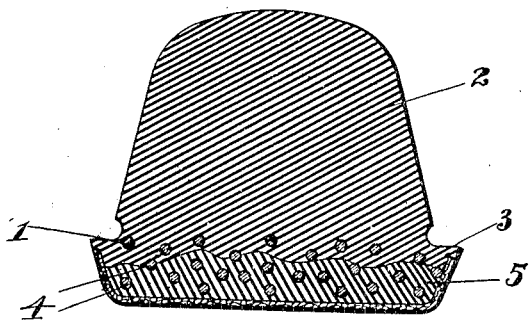

Figure 1 is a side elevation of a portion of a tire constructed in accordance with my invention, and Fig. 2 a transverse sectional view of the same.

In carrying out my improved method I first place a single layer 1 of suitable metal fabric in a straight mold and place upon the top of said fabric a suitable rubber compound. Pressure is then applied and the rubber compound forced through the interstices of the metal fabric. By this operation the tread 2 of the tire is formed and the upper portion 3 of the base. A sheet of metal fabric of the required width, through the interstices of which rubber compound has first been forced, is wrapped around a flat-rimmed circular form until a plurality of layers are built up. The lower portion 5 of the base of the tire is thus formed. The two parts 3 and 5 are then placed in a circular mold and joined, the ends united, and the whole vulcanized.

Heretofore difficulty has been experienced in securing proper adhesion between the tread and the base portions of the tire, because the line of adhesion occurred at the least favorable point. By my improved process the juncture of the two parts 3 and 5 forming the tire is at a point below the first layer of metal fabric, where it is subjected to less strain, and consequently a stronger tire is produced.

I have not claimed in the present application the tire produced by the exercise of my improved method, the same forming the subject-matter of an application filed April 30, 1906, Serial No. 314,503.

Having thus fully described my invention, what I claim as new, and desire to secure by Letters Patent of the United States, is—

1. The method of forming a rubber tire of the type having a plurality of layers of metal fabric or the like embedded therein, consisting in forming two parts of rubber compound having one or more layers of metal fabric embedded in each, and then uniting said parts to form an integral whole.

2. The method of forming a rubber tire of the type having a plurality of layers of metallic fabric or the like embedded therein, consisting in forming the tread and upper portion of the base of rubber compound having embedded therein one or more layers of metallic fabric or the like, then forming the lower portion of the base of rubber compound and one or more layers of metallic fabric, then placing the two parts thus formed together and uniting the ends to form a continuous tire, and finally vulcanizing the whole.

3. The method of forming a rubber tire of the type having a plurality of layers of metallic fabric or the like embedded therein, consisting in placing one or more layers of metal fabric in a mold and placing thereon rubber compound, subjecting the same to pressure, forcing it into the interstices of the fabric and forming the tread and upper portion of the base, then forming the lower portion of the base by forcing rubber compound into the interstices of a sheet of metal fabric and wrapping said sheet of fabric and rubber around a suitable form to form a plurality of layers, then placing the tread and upper portion of the base upon the lower portion of the base, and joining the ends, then subjecting the same to pressure, and finally vulcanizing.

4. The method of forming a rubber tire of the type having a plurality of layers of metal fabric or the like embedded therein, consisting in forming the tread and upper portion of the base in one piece and the lower portion of the base in another piece, each having metal fabric embedded therein, then uniting the two parts, and finally vulcanizing the same whereby a tire is formed having the joint between the two parts at a point within the zone of the wire fabric.

5. The method of forming a rubber tire of the type having a plurality of layers of metal fabric embedded therein consisting in forming the tread and upper portion of the base in one piece and the lower portion of the base in another piece, each having metal fabric embedded therein, then uniting said parts in such a manner that the line of adhesion shall be within the zone of the metal fabric, and finally vulcanizing the whole.

6. The method of forming a rubber tire of the type having a plurality of layers of metal fabric embedded therein, consisting in forming the tread and upper portion of the base in one piece and the lower portion of the base in another piece and in embedding in each of the said pieces, one or more layers of metal fabric, then uniting the parts in such a manner that the line of adhesion shall be within the zone of the metal fabric and finally vulcanizing the whole.

In testimony whereof I affix my signature in presence of two witnesses.

ARTHUR H. MARKS.

Witnesses:
O. S. HART,
F. J. GARRIS.